(No Model.)

G. E. DIXON.
WIRE REEL.

No. 444,314. Patented Jan. 6, 1891.

WITNESSES:
Fred G. Dieterich
M. D. Blondel

INVENTOR:
George E. Dixon.
BY Munn & Co
ATTORNEYS

UNITED STATES PATENT OFFICE.

GEORGE E. DIXON, OF BEACON, IOWA.

WIRE-REEL.

SPECIFICATION forming part of Letters Patent No. 444,314, dated January 6, 1891.

Application filed September 13, 1890. Serial No. 364,917. (No model.)

*To all whom it may concern:*

Be it known that I, GEORGE E. DIXON, of Beacon, in the county of Mahaska and State of Iowa, have invented a new and useful Improvement in Wire Reels and Stretchers, of which the following is a specification.

My invention relates to an improved wire reel and stretcher for winding, unwinding, or stretching wire in constructing and repairing wire fences, and it is equally well adapted for either barbed or smooth wire.

The object of my invention is to provide a combined reel and stretcher that shall be light, cheap, and durable, and also to provide a means whereby the reel will be locked when rotation in a certain direction has ceased, thereby preventing any unwinding or slack in wire being wound or stretched.

With these objects in view my invention consists in the peculiar constructions and novel combinations hereinafter described and claimed.

Figure 1:
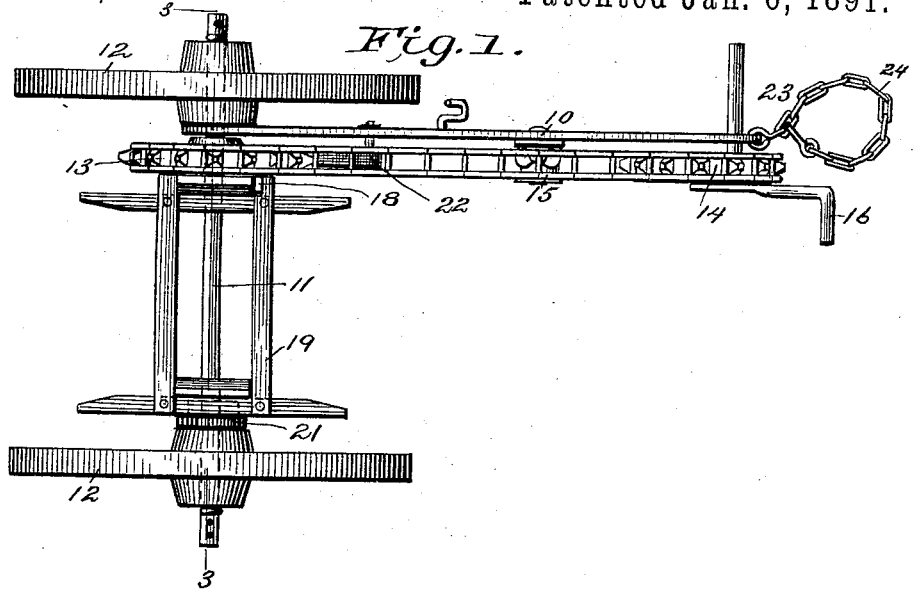
Figure 2:
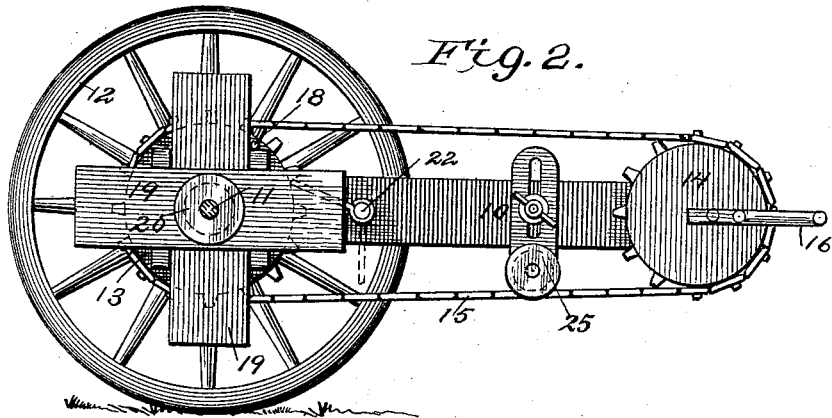
Figure 3:
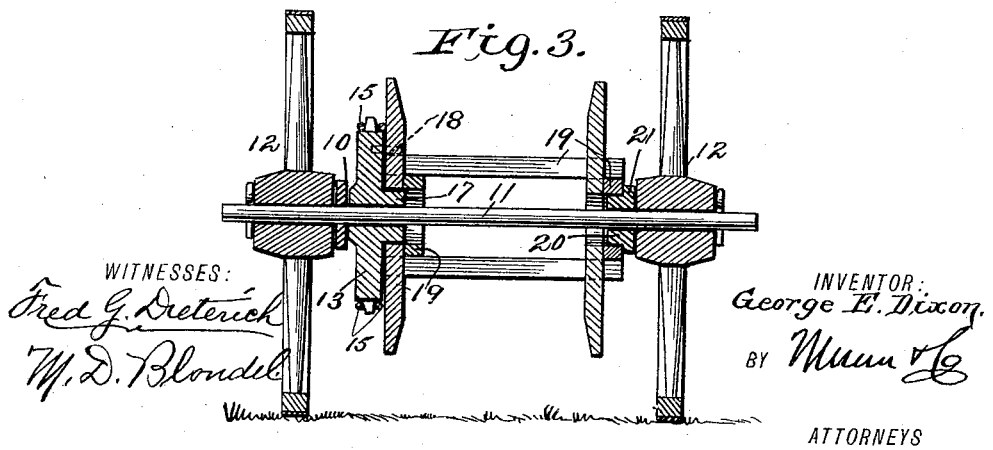

In the drawings forming a part of this specification, and in which the same numerals of reference indicate the same parts, Figure 1 is a top plan view of my improved machine. Fig. 2 is a side view of the same, one of the wheels being removed; and Fig. 3 is a sectional view taken on the line 3 3 of Fig. 1.

In the practical application of my invention I employ a bar or beam 10, either metal or wood, through one end of which beam is passed an axle or shaft 11, said axle being rigid in the said beam. Traction-wheels 12 are mounted upon the opposite ends of the axle, by means of which the machine is transported from place to place.

A sprocket-wheel 13 is mounted loosely upon the axle 11 upon the inner side of the beam or bar 10. A smaller sprocket-wheel 14 is journaled upon the opposite end of the beam 10 and upon the same side as the wheel 14. A drive-chain 15 connects the wheels 13 and 14, and the wheel 14 is provided with a crank 16, whereby the wheel 14 may be revolved and communicate its motion to the wheel 13 through the chain 15. The sprocket-wheel 13 is provided with a hub 17, projecting laterally from its inner face, and also upon the inner face, near the periphery of said wheel, is secured a laterally-projecting pin 18. A reel or spool 19 is arranged upon the axle 11 between the wheels 12. The openings in the end pieces of the reel are considerably larger than the axle, one of them being adapted to fit upon the hub 17. In the opening of the opposite end is inserted a bearing-sleeve 20, said sleeve fitting loosely upon the axle 11 and formed at its outer end with a flange 21, which prevents its passing through the opening in the reel, and which also serves as a washer between the reel and traction-wheel. A pawl 22 is pivoted upon the inner side of the beam or bar 10, said pawl being adapted to engage the teeth of the sprocket-wheel and prevent its being turned backward.

From the foregoing description it will be seen that the reel or spool is mounted loosely upon the axle. The sprocket-wheel 13, however, being provided with the laterally and inwardly projecting pin 19, engages the adjacent end of the reel and moves the same in unison with the said wheel. A handle 23 is secured upon the outer side of the beam opposite the sprocket-wheel 14, by means of which the machine is lifted and moved. A draft-chain 24 is secured to the outer end of the bar 10 and provided at its free end with a hook, whereby the chain can be wrapped around a post to hold the reel while stretching wire. The pawl can be reversed and the reel moved in either direction.

The manner of operating my improved machine is obvious to every one skilled in the art to which it relates, and a detailed description is unnecessary in this specification.

Having thus described my invention, what I claim as new is—

1. In a wire reel and stretcher, the combination, with a beam, of a shaft passed through the same at one end, traction-wheels mounted upon the ends of the shaft, a sprocket-wheel mounted upon the shaft upon the inner side of the beam, a sprocket-wheel journaled to the opposite end of the beam and also upon the inner side, the crank attached thereto, the drive-chain, the pawl pivoted to the inner side of the beam, and the wire-reel mounted loosely upon the shaft and operated by the adjacent sprocket-wheel, substantially as shown and described.

2. An improved wire reel and stretcher, consisting of the beam 10, axle or shaft 11, traction-wheels 12, sprocket-wheels 13 and 14, drive-chain 15, crank 16, hub 17, integral with the sprocket-wheel 13, the laterally-projecting pin 18, wire reel or spool 19, the bearing-sleeve 20, having the flange 21, and the pawl 22, all constructed and combined substantially as shown and described.

GEORGE E. DIXON.

Witnesses:
CAM. CULBERTSON,
R. M. ROYER.